M. A. DAVIS.
AUTOMOBILE WINDLASS.
APPLICATION FILED NOV. 5, 1919.

1,337,757.

Patented Apr. 20, 1920.

Inventor.
Marion A. Davis.
By J. P. Dederick.
Attorney.

UNITED STATES PATENT OFFICE.

MARION A. DAVIS, OF SHERMAN, TEXAS.

AUTOMOBILE-WINDLASS.

1,337,757.   Specification of Letters Patent.   Patented Apr. 20, 1920.

Application filed November 5, 1919. Serial No. 335,863.

*To all whom it may concern:*

Be it known that I, MARION A. DAVIS, a citizen of the United States, residing at Sherman, in the county of Grayson and State of Texas, have invented certain new and useful Improvements in Automobile-Windlasses, of which the following is a specification.

This invention relates to certain new and useful improvements in automobile windlasses of the type illustrated in my allowed application, Serial No. 305,832, filed June 21st, 1919. In order for devices of this type to operate satisfactorily, it is necessary that they be attachable to either rear wheel of a car. To this end attaching means is provided at both ends of the windlass, one end being adapted to engage the spokes of the right rear wheel, and the other end the left wheel of the car.

The windlass above referred to operates in a satisfactory manner under certain conditions, but it was found that when, as often occurs, the differential permits one wheel of a stalled car to remain idle while the other is revolved, the windlass for one wheel only would often be rendered inoperative or, at least, incapable of satisfactory operation. To overcome this objection I have devised an automobile windlass having attaching means at both its ends.

Further objects and advantages of this invention will appear in the following description, and the novel features thereof will be particularly pointed out in the appended claim.

Figure 1:
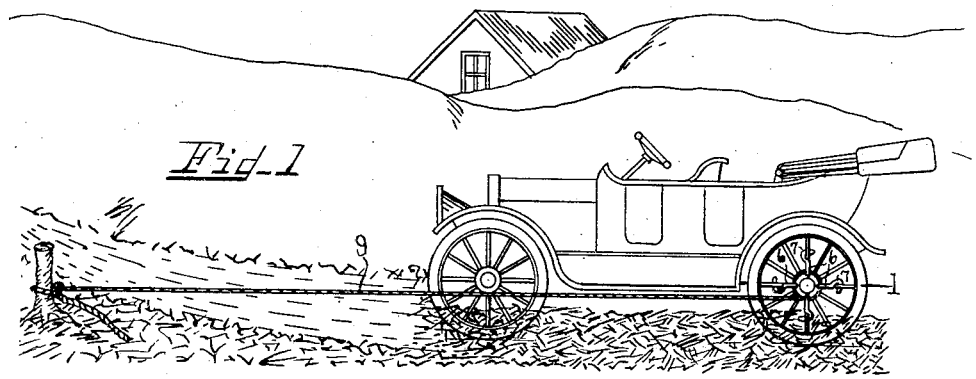
Figure 2:
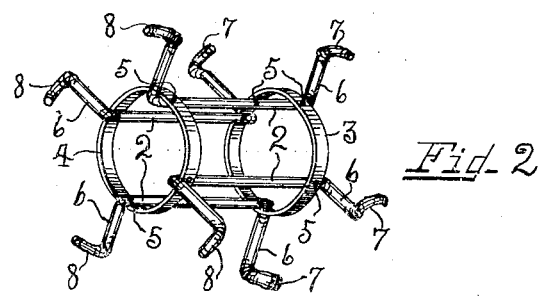

In the drawings:—Figure 1 is a side elevation of a stalled automobile showing the extricating means attached. Fig. 2 is an enlarged view in perspective of the windlass only.

Referring to the drawings, there is shown an automobile which is assumed to be stalled in the mud, the showing being to a large extent typical rather than illustrative of any particular style of car, since they may vary considerably in structure, and the showing of Fig. 1 is therefore to be taken as indicative of any type of car.

To a rear wheel 1 of the car the windlass is shown attached, the same being formed of four horizontal rod portions 2, equally spaced radially and interiorly of bands 3 and 4 to which they are secured by rivets 5, thus forming the drum of the windlass. Both ends of the rod portions 2, after extending through the bands 3 and 4, are bent at right angles and radially to said portions as designated by 6, and they terminate respectively in outward semicircular bends 7 and 8, the former adapted for engagement with any series of four spokes of the left wheel that cross at right angles, and the latter for engagement with similar spokes of the right wheel, and by which the windlass in either case is held in operative position. The radially bent ends not attached to the wheel act as a guard for the rope 9, when being wound upon the drum.

When not required for use, the rope may be wound upon the drum and the device placed under a seat of the car. When needed it is quickly attached to the spokes of a rear wheel, the rope unwound and secured to a suitable anchorage, when the engine being started and the wheels revolved, will cause the rope to be wound upon the drum, and the car tugged to a more permanent roadway.

From the foregoing it is apparent that I produce a simple and inexpensive device which will be strong and durable, but in attaining these ends I do not wish to be limited to the precise details herein set forth, inasmuch as minor changes in the form, proportion and exact manner of assemblage of the parts may be made without departing from the spirit of the invention.

Having thus described my invention, what I esteem as new and desire to secure by Letters Patent of the United States is:—

The combination in an automobile windlass of horizontally disposed rods, and bands supporting the same forming the drum thereof, both ends of said rods being bent radially and at right angles to the said horizontal portions, the upper ends of the radially bent arms at one end of the windlass terminating in outward semicircular bends adapted for engagement with the spokes of a wheel at one side of a car, and the radially bent arms at the opposite ends of said horizontal rods having semicircular bends adapted for engagement with the spokes of a wheel at the opposite side of said car.

In testimony whereof I affix my signature.

MARION A. DAVIS.